(12) United States Patent
Cessel et al.

(10) Patent No.: US 10,944,882 B2
(45) Date of Patent: Mar. 9, 2021

(54) IMAGE SENSOR LINE ORIENTATION

(71) Applicant: HEWLETT-PACKARD DEVELOPMENT COMPANY, L.P., Spring, TX (US)

(72) Inventors: Gianni Cessel, Sant Cugat del Valles (ES); Javier Onecha Celestino, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/492,627

(22) PCT Filed: Dec. 1, 2017

(86) PCT No.: PCT/US2017/064172
§ 371 (c)(1),
(2) Date: Sep. 10, 2019

(87) PCT Pub. No.: WO2019/108221
PCT Pub. Date: Jun. 6, 2019

(65) Prior Publication Data
US 2020/0288032 A1 Sep. 10, 2020

(51) Int. Cl.
*H04N 1/03* (2006.01)
*H04N 1/028* (2006.01)
(52) U.S. Cl.
CPC ........... *H04N 1/03* (2013.01); *H04N 1/02815* (2013.01)
(58) Field of Classification Search
CPC ............ B65H 2220/01; B65H 2220/03; B65H 2511/152; B65H 2511/216; B65H 2511/242; B65H 2515/10; B65H 31/02; B65H 2511/11; B65H 2511/182; B65H 2511/20; B65H 2511/22; B65H 2511/24; B65H 2511/30; B65H 2511/416; B65H 2220/09; B65H 2801/36; B65H 2220/02; B65H 2404/1112; B65H 29/22; B65H 29/50; B65H 29/68; B65H 31/04; B65H 31/10; B65H 31/14; B65H 31/22; B65H 31/26; B65H 31/34; B65H 31/36; B65H 2301/4212; B65H 2406/121;
(Continued)

(56) References Cited

U.S. PATENT DOCUMENTS 4,149,091 A    4/1979 Crean et al.
4,870,483 A *  9/1989 Nishigaki .............. H04N 1/486
                                                         358/512
(Continued)

FOREIGN PATENT DOCUMENTS

EP    2792137 A0    10/2014

OTHER PUBLICATIONS

Wide Format Scanner Buyer's Guide, Feb. 10, 2014, http://www.imageaccess.de/_WhitePapers/PDF/WideFormatScannerBuyersGuide.pdf.

(Continued)

*Primary Examiner* — Negussie Worku
(74) *Attorney, Agent, or Firm* — HP Inc. Patent Department

(57) ABSTRACT

An example scanner assembly includes a housing formed with corners to allow an image sensor line to align cornerwise. An example scanner apparatus may include a plurality of scanner assemblies with an image sensor line oblique to the media advance direction.

15 Claims, 5 Drawing Sheets

Figure 5A:
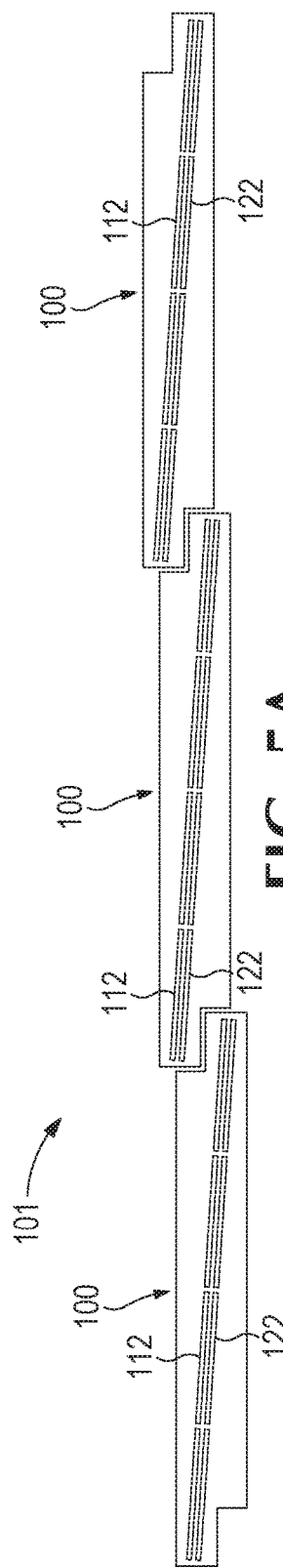

(58) Field of Classification Search
CPC .............. B65H 2406/3662; B65H 1/04; B65H
2402/10; B65H 2553/21; B65H 2553/412;
B65H 2553/416; B65H 2557/20; B65H
2557/61; B65H 2801/06; B65H 2801/27;
B65H 37/06; B65H 3/0669; B65H 45/12;
B65H 5/06; B65H 7/02; B65H 7/10;
B65H 2301/4215; B65H 2301/4461;
B65H 2406/12; B65H 2406/362; B65H
2406/3632; B65H 2701/11312; B65H
2701/1313; B41J 13/106; B41J
2002/1655; B41J 2002/1657; B41J
2002/16573; B41J 2002/16591; B41J
25/001; B41J 2/15; B41J 2/155; B41J
2/16505; B41J 2/16535; B41J 2/16544;
B41J 2/16585; B41J 11/002; B41J
11/008; B41J 13/0009; B41J 29/393;
B41J 15/02; B41J 15/042; B41F 13/64;
G03G 15/6502; G03G 15/6582; G03G
2215/00569; G03G 2215/00729; G03G
2215/00877; H04N 1/0057; H04N
1/00588; H04N 1/00591; H04N 1/00594;
H04N 1/00602; H04N 1/00604; H04N
1/00628; H04N 1/00631; H04N
2201/0081; H04N 1/6033; H05B
2203/032; H05B 3/0033; B26D 5/00

USPC ........................................................ 358/474
See application file for complete search history.

(56) References Cited

U.S. PATENT DOCUMENTS

| | | | |
|---|---|---|---|
| 4,899,226 A * | 2/1990 | Tanimoto | H04N 1/19505 |
| | | | 358/451 |
| 5,357,351 A | 10/1994 | Nakajima et al. | |
| 6,348,981 B1 | 2/2002 | Walsh | |
| 7,385,169 B2 | 6/2008 | Saitou et al. | |
| 7,426,064 B2 | 9/2008 | Cunningan et al. | |
| 7,773,269 B2 | 8/2010 | Kim | |
| 8,767,274 B2 | 7/2014 | Tsumekawa et al. | |
| 8,922,849 B2 | 12/2014 | Cullum et al. | |
| 9,100,524 B2 | 8/2015 | Kato et al. | |
| 2013/0157282 A1* | 6/2013 | Bouzid | G01N 21/76 |
| | | | 435/7.1 |
| 2014/0036323 A1 | 2/2014 | Kaempflein et al. | |
| 2015/0156298 A1* | 6/2015 | Ikemoto | H04M 1/21 |
| | | | 455/556.1 |
| 2016/0006898 A1* | 1/2016 | Tsumekawa | H04N 1/02835 |
| | | | 358/484 |
| 2016/0234445 A1* | 8/2016 | Shimoda | H04N 5/332 |
| 2016/0327279 A1* | 11/2016 | Bhogal | A47J 37/0664 |
| 2018/0152583 A1* | 5/2018 | Sugiyama | H04N 1/1225 |
| 2019/0149679 A1* | 5/2019 | Onecha | H04N 1/00602 |
| | | | 358/498 |
| 2019/0278102 A1* | 9/2019 | Suter | G02B 27/646 |
| 2020/0275059 A1* | 8/2020 | De Bonet | G06K 9/00771 |
| 2020/0301099 A1* | 9/2020 | Zhao | H04N 5/2257 |

OTHER PUBLICATIONS

HPDC, "Extended European Search Report," dated Jan. 12, 2021, EP App. No. 17 93 3459, 9 pp.

* cited by examiner

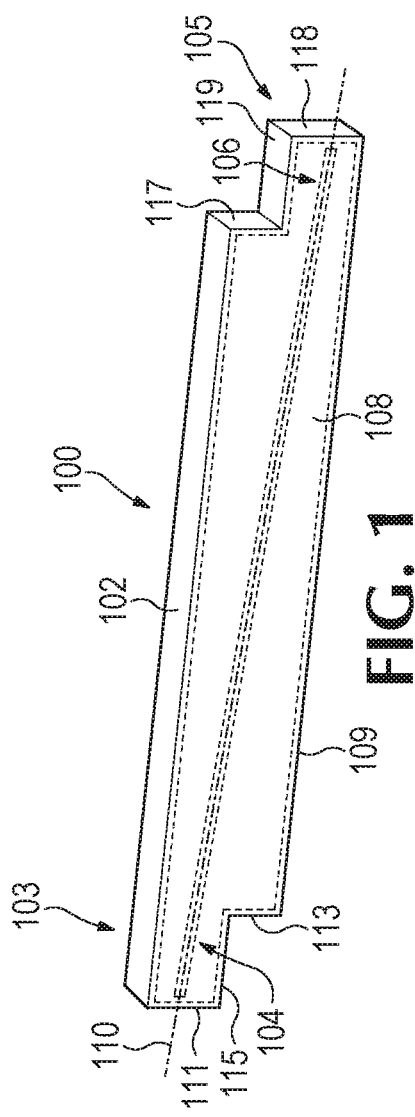
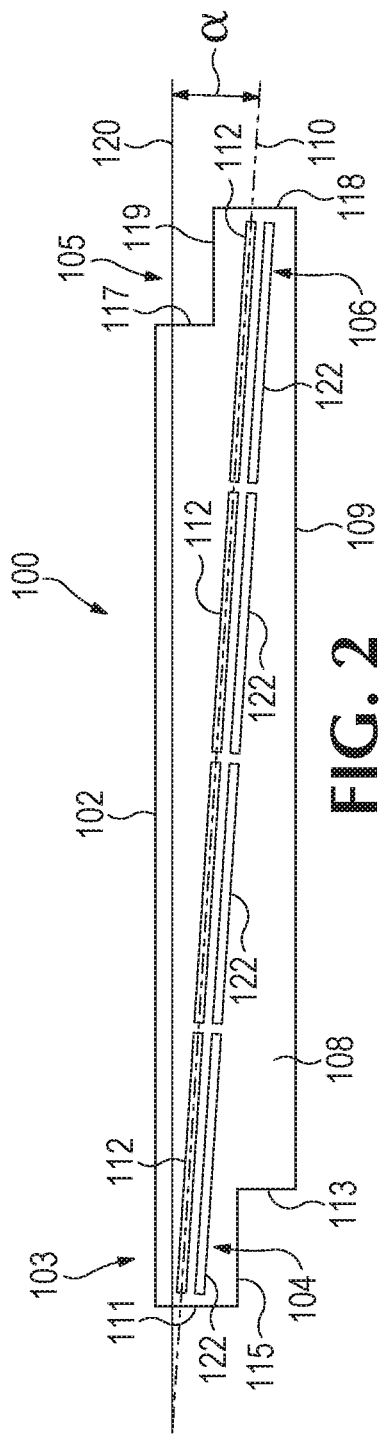

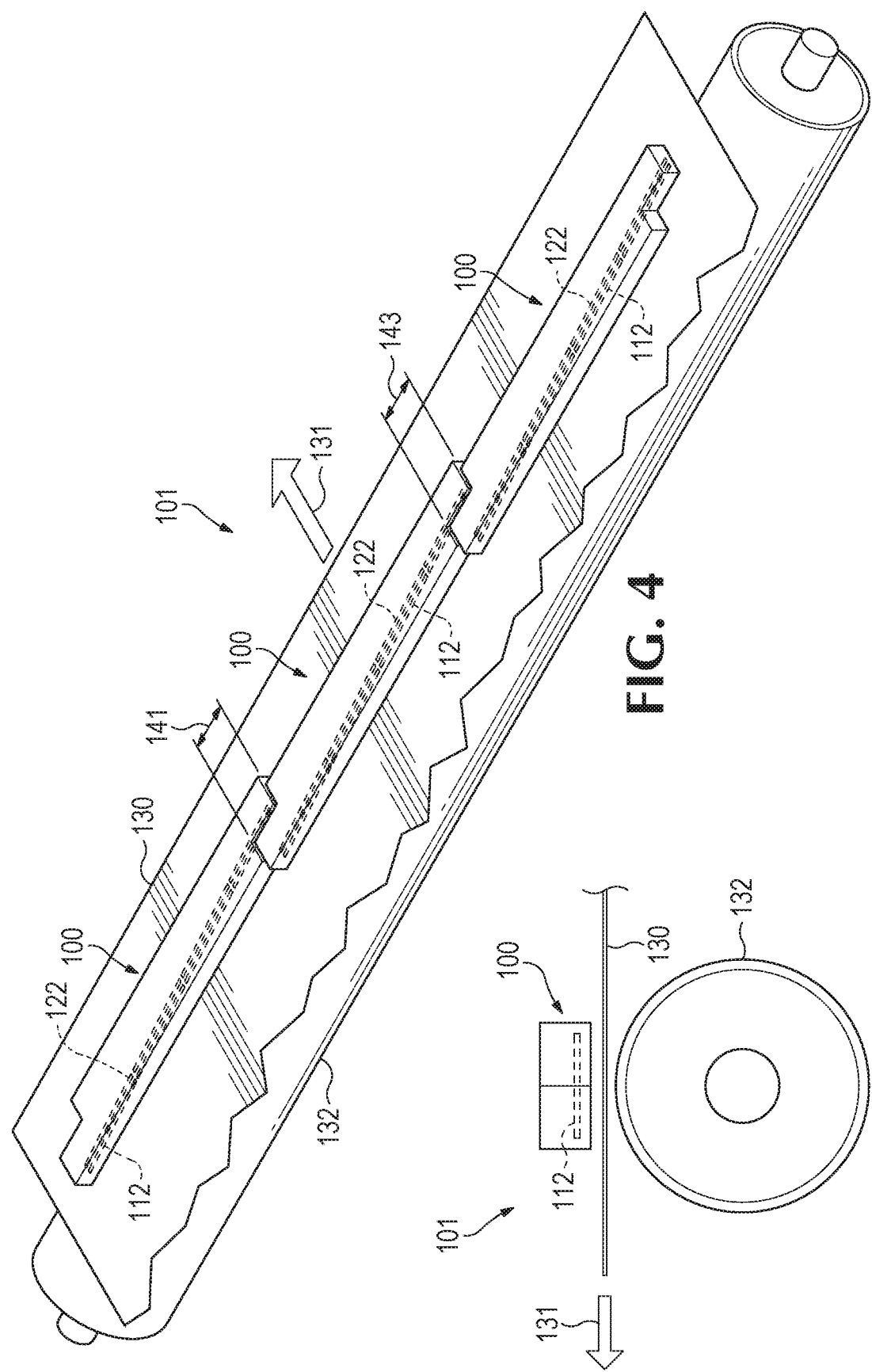

IMAGE SENSOR LINE ORIENTATION

BACKGROUND

Images are processed for use with computing machines, such as a scanner apparatus or a print apparatus. A scanner apparatus, for example, may scan an image original to generate a copy, such as a digital representation of the image data corresponding to the original. A print apparatus, for example, may use control data based on processed image data to reproduce a physical representation of an image by operating a print fluid ejection system according to the control data.

BRIEF DESCRIPTION OF THE DRAWINGS

FIGS. 1 and 2 are block diagrams depicting example scanner assemblies.

FIG. 3 depicts a side view of an example scanner apparatus

FIG. 4 depicts a perspective view of an example scanner apparatus.

FIGS. 5A and 5B depicts example scanner apparatus.

FIGS. 6A-6H are examples of interlocking faces usable with example scanner assemblies.

FIG. 7 is a block diagram depicting an example scanner system.

DETAILED DESCRIPTION

In the following description and figures, some example implementations of scanner apparatus, scanner systems, scanner assemblies, and/or methods of scanning are described. In examples described herein, a "scanner assembly" refers to a scanner module used to perform a scan (i.e., a sensor-based intake of image date). A scanner assembly includes electronics to perform a scan operation and a housing to contain the electronics. A "scanner system" refers to circuitry or a combination of circuitry and executable instructions to perform a scanning operation of a target original. A "scanner apparatus" may be a device that includes a scanning system to operate a scanner assembly to perform a scanning operation. For example, a scanner apparatus may include a plurality of scanner assemblies operated by a controller and media handling components to guide the media towards the image sensor lines of the plurality of scanner assemblies.

As used herein, a "print apparatus" may be a device to print content on a physical medium (e.g., paper, textiles, a layer of powder-based build material, etc.) with a print material (e.g., ink or toner). For example, the print apparatus may be a wide-format print apparatus that prints latex-based print fluid on a print medium, such as a print medium that is size A2 or larger. In some examples, the physical medium printed on may be a web roll or a pre-cut sheet. In the case of printing on a layer of powder-based build material, the print apparatus may utilize the deposition of print materials in a layer-wise additive manufacturing process. A print apparatus may utilize suitable print consumables, such as ink, toner, fluids or powders, or other raw materials for printing. In some examples, a print apparatus may be a three-dimensional (3D) print apparatus. An example of fluid print material is a water-based latex ink ejectable from a print head, such as a piezoelectric print head or a thermal inkjet print head. Other examples of print fluid may include dye-based color inks, pigment-based inks, solvents, gloss enhancers, fixer agents, and the like.

A multifunction peripheral device (MFD) may be a print apparatus combined with a scanner apparatus to offer the ability to scan a target original and print copies of the target original with the same device. A MFP capable of supporting larger media, such as A2 or larger sheets, may include a scanner apparatus to extend across the entire width of the media or may use multiple scanner assemblies, such as an array of scanner assemblies extending across the width of the media. Such assemblies may be staggered and overlap on each end to allow for stitching of images identified from the electronics in each scanner assembly. The overlapping section may sometimes appear defective because the offset to re-align the image is not always constant due to, for example, movements of the paper during transportation over the media path of the scanner apparatus.

Various examples described below relate to a scanner assembly with an image sensor having an image sensor line oriented at angle with respect to the scanner assembly housing and/or the media advance direction. By adjusting the configuration of the electronics and the housing, the offset distance may be reduced, for example.

FIGS. 1 and 2 are block diagrams depicting example scanner assemblies 100. Referring to FIG. 1, the scanner assembly 100 includes a housing 102 with a face 108 having a first leg 103 and a second leg 105. The face 108 may define a frame 109 corresponding to a window for an image sensor. For example, the frame 109 may be a border for a glass sheet to protect an image sensor and the glass window allows the image sensor to be orientated towards the window to take a reading through the window. The housing 102 may be hermetically sealed to control the environment for containing electronics, such as an image sensor, a controller (i.e., a processor resource and memory resource with a control program stored thereon), and/or other circuitry. An image sensor may be any sensor capable of producing data corresponding to light waves. Example image sensor technology includes contact image sensors (CIS), charge coupled devices (CCD), or related image sensor technology.

The scanner assembly 100 of FIG. 1 is shown as substantially rectangular where the shorter sides of the rectangle have corners that include extension cavities substantially diagonally opposing each other. In the example of FIG. 1, a first corner exists at the leg 103 having an extension cavity 104 and a second corner exists on the opposite side of the housing at leg 105 which includes extension cavity 106. An image sensor is to be aligned along the image sensor line 110 from the first extension cavity 104 to the second extension cavity 106. In this manner, the housing 102 may be substantially z-shaped, with legs extending on each side having complementary indentations, next to the corners, as defined by walls 113, 115, 117, and 119. The image sensor line (e.g., the axis across the distance of the image sensor corresponding to the sensor's capability of taking a sensor reading) may extend into the cavities 104 and 106. For example, the image sensor line 110 extends such that the image sensors capability extends past the walls 113 and 117 and towards walls 111 and 118 with respect to the face 108 facing the media to be advanced across the window. In other examples, the scanner assembly housing may include other shapes to be oriented cornerwise (e.g., diagonally from one corner to the other) or otherwise aligned with an image sensor line oblique to the expected media advance direction.

Referring to FIG. 2, the housing 120 of the example scanner assembly 100 includes a plurality of image sensors 112. The plurality of image sensors are aligned to form a scannable area of the scanner assembly 100. In the example of FIG. 2, the plurality of image sensors are oriented in a substantially linear alignment to form an image sensor line along a scannable length of the scannable area. An image sensor line may be an average intersection across an array of photoreceptors of a contact image sensor that extends along the width of the array of contact image sensors. The image sensor line 110 is at an angle alpha ($\alpha$) that is oblique to the housing orientation as represented by line 120. Line 120 may also represent the width of the media path substantially perpendicular to the media advance direction. The angle alpha may be greater than one degree and less than 90 degrees with respect to the line 120. In some examples, the angle alpha is between 1 degree and 15 degrees with respect to the width of the media moving in the media advance direction. In other examples, the angle alpha is between 2 degrees and 10 degrees. In yet other examples, the angle alpha is between 5 degrees and 8 degrees. In one example, the ends of the sensor line may be offset in the media advance direction by about 15 mm over a distance of about 290 mm perpendicular to the media advance direction. As shown in FIG. 2, the scannable length of the plurality of image sensors 112 extends along the image sensor line from within a first extension cavity 104 to a second extension cavity 106. In other words, the image sensors on each end of the image sensor line are contained at least partially within the cavities 104 and 106 of the legs of the housing 102.

An illumination device 122 may be part of the electronics contained in the housing 102 with an image sensor 112. The illumination device 122 may be oriented to be aligned substantially parallel to the image sensor line, for example, for proper illumination of the media while be scanned by an image sensor 112. In the example of FIG. 2, each image sensor 112 is accompanied by an illumination device 122. In other examples, a single illumination device may be used with a plurality of image sensors or multiple illumination devices may be used with a single image sensor.

FIGS. 3 and 4 depict example scanner apparatus 101. FIG. 3 depicts a side view of an example scanner apparatus 101. The scanner apparatus 101 includes an example scanner assembly 100 and a media guide 132. As discussed with regards to FIGS. 1 and 2, the scanner assembly 100 may include a sealed housing for electronics including an image sensor 112 placed along an image sensor line and a window on a face of the sealed housing through which the image sensor 112 is facing to be oriented towards a scan location (e.g., over the media guide 132) and at an oblique angle with respect to a central axis of the body of the sealed housing along the plane of the window. With regards to FIG. 3, the image sensor 112 may be placed within the housing substantially parallel with respect to the media path (e.g., able to take sensor readings across media moving in the media advance direction) and, with respect to the housing, the image sensor line may be substantially parallel to a plane on which the window is located.

With regards to FIG. 4, the scanner apparatus 101 may include a plurality of scanner assemblies 100 with image sensors 112 in an oblique orientation with respect to the media advance direction (e.g., at an oblique angle with respect to the width of the media as it advances in the media advance direction).

The media guide 132 may guide media 130 in a media advance direction 131 along a media path between the media handling component 132 and the scanner assembly 100. The media guide 132 may be any appropriate media handling component. Example media guides 132 may include a driven roller, a free roller, a rectangular ramp, a cuboid feature, a calibration unit, the like, or any combination thereof. The media guide may include a mechanism to assist movement of the media in a media advance direction and/or may include mechanisms to apply force on the media towards the scanner assembly. For example, the media guide may be a biased cuboid that provides bias force perpendicular to the media path and towards the image sensor line (e.g., apply a force to move media against the glass window of the scanner assembly). As shown in FIG. 4, the image sensors 112 may be placed to extend diagonally across the housing of the scanner assemblies 110 (e.g., the image sensor lines extend diagonally across the window of each of the scanner assemblies 100).

FIG. 4 depicts a perspective view of an example scanner apparatus 101 with a plurality of scanner assemblies 100 located across a scanning zone of a media path. The scanner assemblies 100 appear substantially cuboid in shape with a face of the sealed housing on which the window is located is substantially rectangular with an indentation formed to align with a housing shape of another sealed housing. Each of the scanner assemblies 100 include an overlap portion with another scanner assembly 100. The middle scanner assembly, for example, includes a first overlap portion 141 on the left side that overlaps another scanner assembly of the plurality of scanner assemblies with respect to a first housing side of the middle scanner module that is substantially parallel to a media advance direction and to a second housing side of the first scanner assembly that is substantially perpendicular to the media advance direction, with a similar overlap portion 143 on the right side that overlaps yet another scanner assembly. The overlapping portions may generate a complementary interface (i.e., dovetailing) with the housing structure. Examples of complementary structures for the overlapping portions are discussed further with regards to FIGS. 6A-6H.

As shown in FIG. 4, the image sensors of the middle scanner assembly extend in a line into the first overlap portion 141 and along an image sensor line at an oblique angle with respect to the media advance direction 131. The image sensor line of the image sensor of the middle scanner assembly may also be oriented at an oblique angle with respect to the orientation of the housing across the media path.

As mentioned above, the image sensor line is at an oblique angle with respect to a media advance direction 131. The sensor line may extend across a media advance direction of the housing and past a wall of the formed indent into a leg cavity of the housing. This occurs in each assembly 100 that the sensor lines extend past the indent walls and into the cavities so that the image sensors 112 overlap and generate duplicate readings of portions of the media 130 as it moves in the media advance direction 131. In this manner, the image sensor line of the first scanner assembly 100 extends from the first overlap portion 141 of a housing of the first scanner assembly to the second overlap portion 143 of the housing of the first scanner assembly. The amount of overlap of the overlap portions 141 and 143 may be based on a desired implementation. For example, the first housing side of the first scanner assembly may be overlapped by more than half of a width of the first housing side by the second scanner assembly with respect to the media advance direction 131. In that example, the amount of overlap may allow for minimizing the width of glass covering the scanner assemblies. The overlap portion may also change the amount of offset distance between scanner assemblies. For example, an offset distance between the first scanner assembly and the second scanner assembly at the first overlap portion may be less than a distance between a first end of the image sensor line and a second end of an image sensor line with respect to a media advance direction oblique to the image sensor line. In this manner, relatively smaller offset in the media advance direction may be achieved between scanner assemblies, which also may improve scanning quality. In some examples, there may be no offset between scanner assemblies.

Figure 5B:
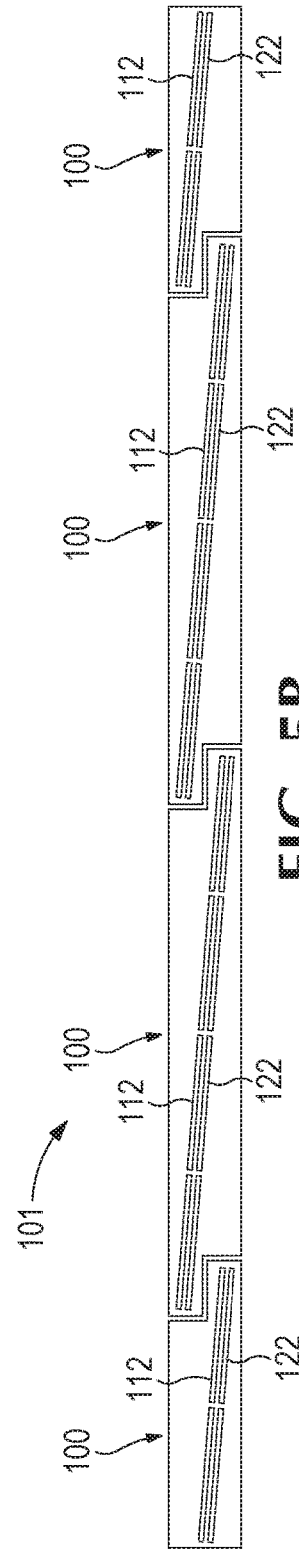

FIGS. 5A and 5B depicts example scanner apparatus 101. A scanner apparatus 101 may have a plurality of scanner assemblies 100 in an array across a media path. The plurality of scanner assemblies 100 may be staggered across a width of media path in the media advance direction. The plurality of media guides may be staggered with respect to the media advance direction with an offset location relative to proximate scanner assemblies and the media advance direction as shown in FIG. 5A. In other examples, the plurality of scanner assemblies 100 may include housing interfaces that allow for the scanner assemblies to be located in line with each other as shown in FIG. 5B (e.g., without an offset among the assemblies in either the media advance direction or perpendicular thereto).

Figure 6A:
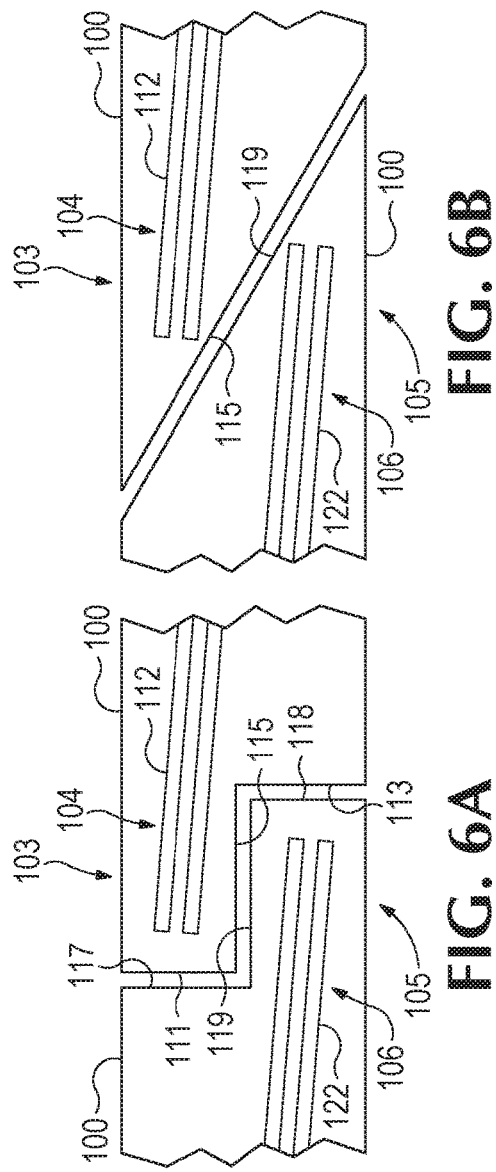
Figure 6B:
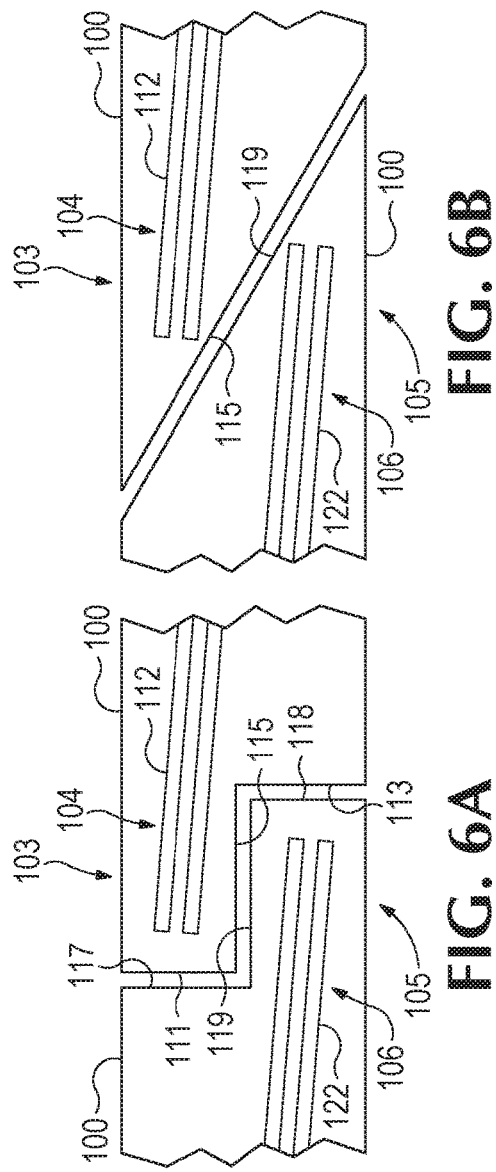

FIGS. 6A-6H are examples of interlocking faces usable with example scanner assemblies. The scanner assemblies are shown to include complementary structure to allow assemblies to engage with each other and form overlapping portions across the assemblies. In some examples, the faces of the housing structures are complementary to interlock or otherwise abut each other in a complementary way. Referring to FIG. 6A, the scanner assemblies include a first leg 103 having a first interlock face (e.g., 115) directed away from the first extension cavity 104 defined within the first leg 103 and a second leg 105 having a second interlock face (e.g., 119) directed away from a second extension cavity 106 defined within the second leg 105. The faces of the scanner assemblies of FIG. 6A are perpendicular to each other and/or parallel to the faces of the rectangular housing. In the example of FIG. 6B, the complementary faces 115 and 119 are at an oblique angle with respect to the length of the house and/or with respect to faces 111, 113, 118, and/or 119. Having an angular face in the overlapping area of the scanner assemblies may allow for image sensors to be at an angle and allow for the assemblies to be abutted closer to the angle of the image sensor line. For example, the faces 115 and 119 could be parallel to the image sensor line of the assemblies. In some examples, the angular structure may extend to the leading and trailing edges of the housing (e.g., along the length of the housing) making the extension cavities triangular or otherwise having an acute or obtuse angle in the extension cavity, while in other examples a right angle corner may exist.

Figure 6C:
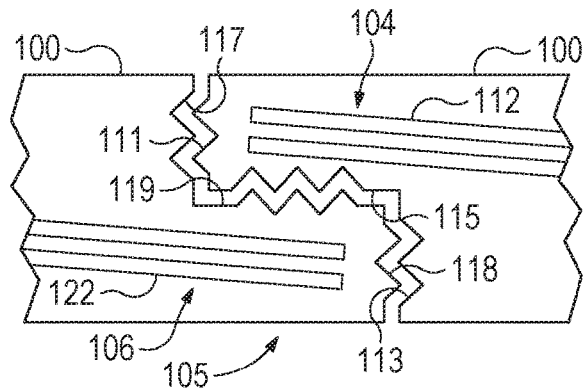
Figure 6D:
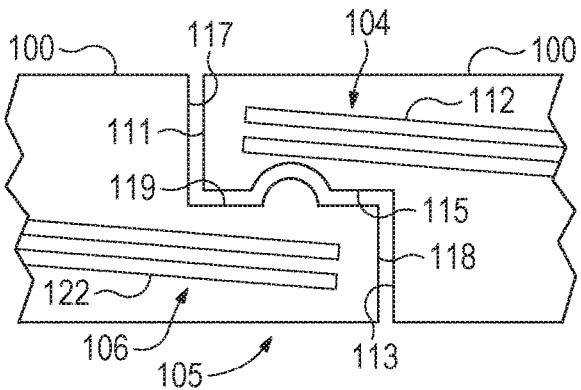
Figure 6E:
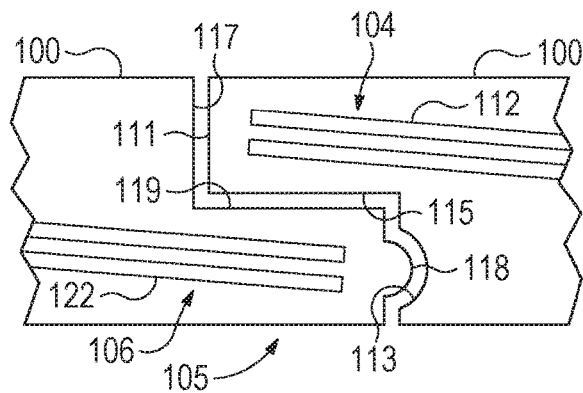
Figure 6F:
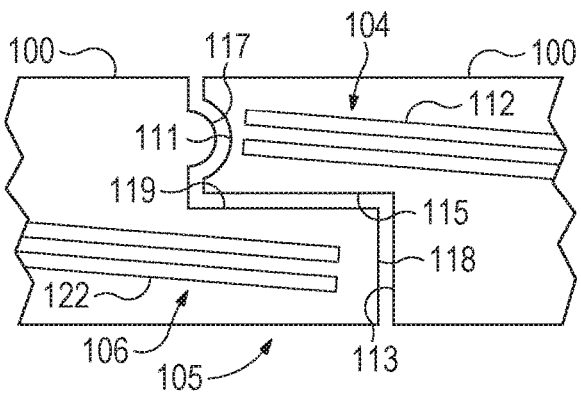
Figure 6G:
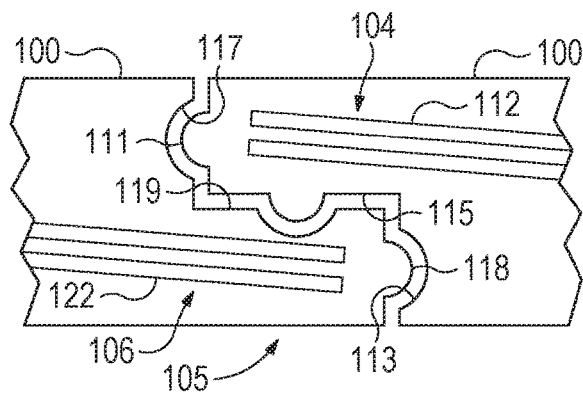

Referring to FIG. 6C, the faces of the scanner assemblies around legs 103 and 105 may dovetail and may include an intricate, but still complementary design. Referring to FIGS. 6D-6G, the dovetailing features of the interlocking faces may be a single face or may exist on multiple faces.

Figure 6H:
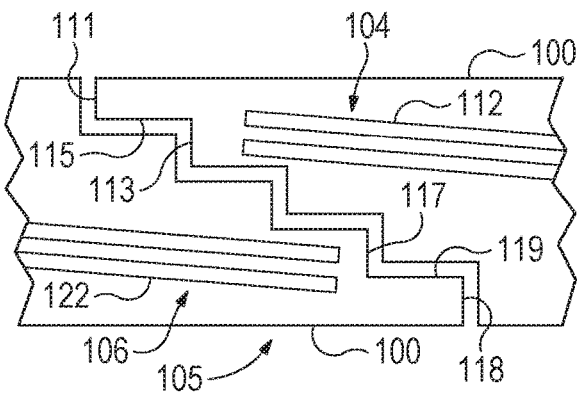

Referring to FIG. 6H, the interlocking faces may be designed in a step formation, to allow a manufacture to determine an amount of overlap and offset to include. For example, a step structure may allow for an increase of overlapping image sensors within legs 103 and 105 while increasing the distance between image sensor lines. In contrast, the offset distance between scanner assemblies may be reduced while also reducing the amount of overlap between the image sensors of legs 103 and 105.

Figure 7:
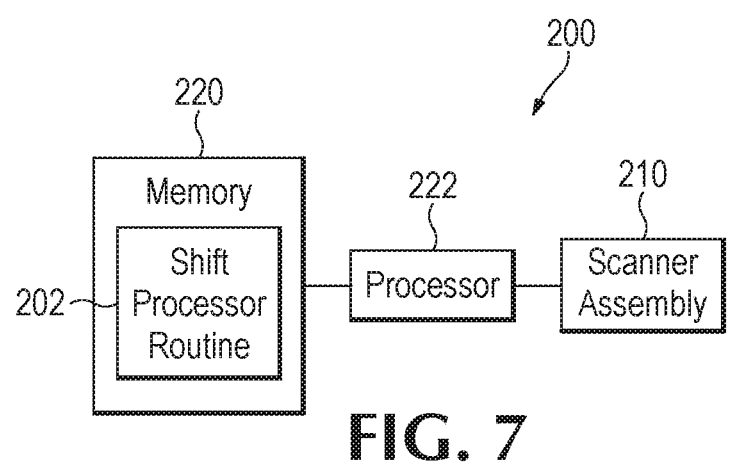

FIG. 7 is a block diagram depicting an example scanner system 200. FIG. 7 depicts the example system 200 may comprise a memory resource 220 operatively coupled to a processor resource 222 and a scanner assembly 210 operatively coupled to the processor resource 222. Referring to FIG. 7, the memory resource 220 may contain a set of instructions that are executable by the processor resource 222. The set of instructions are operable to cause the processor resource 222 to perform operations of the system 200 when the set of instructions are executed by the processor resource 222. The set of instructions stored on the memory resource 220 may be represented as a shift processor routine module 202. The shift processor routine module 202 represents program instructions that when executed function to perform a shift processing routine on image data retrieved by an image sensor of the scanner assembly 210. The processor resource 222 may carry out a set of instructions to execute the modules 202 and/or any other appropriate operations among and/or associated with the system 200. For example, the processor resource 222 may carry out a set of instructions to cause the processor resource 222 to perform a shift processing operation to deskew rotation corresponding to the oblique angle of the image sensor line (e.g. perform a counter-clockwise rotation of the image data corresponding to the angle of the image sensor line with respect to the media advance direction). For another example, the processor resource 222 may carry out a set of instructions to cause the processor resource 222 to perform an alignment of the image data recorded by the imaging electronics (e.g., image sensors) of the plurality of scanner assemblies and perform a stich operation to combine the readings from the image sensors of each scanner assembly of the plurality of scanner assemblies of a scanner apparatus. For yet another example, the processor resource 222 may carry out a set of instructions to cause the processor resource 222 to increase the resolution of the scan based on the oblique angle.

By placing image sensors at an angle with respect to media advance and using a shift processing routine to compensate for the angle, defects due to offset variation, which may be induced by dynamic movement of the media during transport, may be reduced and the amount of memory resources used to store the image of the length of the offset (e.g., before alignment and stitching are performed) may also be reduced, as examples. Other detrimental visual effects, such as aliasing, may be avoided by changing the resolution with respect to a print device due to the resolution of the scanner apparatus being higher than the sensor itself as a result of the image sensor line being at an oblique angle with respect to the media advance direction. For example, an image sensor of a scanner assembly may have a 600 pixel resolution, but when placed at an angle is able to take that 600 pixel resolution over a shorter perpendicular distance to the media advance direction (i.e., a portion of the media width shorter than 600 pixels) proportional to the angle with respect to the perpendicular to the media advance direction. In this manner, the resolution increases proportional to the degree of obliqueness of the angle with respect to the media width (e.g., angle alpha as shown in FIG. 2) and a reduction in an aliasing effect is possible, for example, proportional to the angle.

Although this particular module is illustrated and discussed in relation to FIG. 7 and other example implementations, other combinations or sub-combinations of modules may be included within other implementations. Said differently, although the module illustrated in FIG. 7 and discussed in other example implementations perform specific functionalities in the examples discussed herein, these and other functionalities may be accomplished, implemented, or realized at different modules or at combinations of modules. For example, functionalities performed at one module as discussed in relation to these examples may be performed at a different module or among a plurality of modules.

A processor resource is any appropriate circuitry capable of processing (e.g., computing) instructions, such as one or multiple processing elements capable of retrieving instructions from a memory resource and executing those instructions. For example, the processor resource 222 may be a central processing unit (CPU) that enables shift processing based on the angle of the image sensor line by fetching, decoding, and executing module 202. Example processor resources include at least one CPU, a semiconductor-based microprocessor, a programmable logic device (PLD), and the like. Example PLDs include an application specific integrated circuit (ASIC), a field-programmable gate array (FPGA), a programmable array logic (PAL), a complex programmable logic device (CPLD), and an erasable programmable logic device (EPLD). A processor resource may include multiple processing elements that are integrated in a single device or distributed across devices. A processor resource may process the instructions serially, concurrently, or in partial concurrence.

A memory resource represents a medium to store data utilized and/or produced by the system 200. The medium is any non-transitory medium or combination of non-transitory media able to electronically store data, such as modules of the system 200 and/or data used by the system 200. For example, the medium may be a storage medium, which is distinct from a transitory transmission medium, such as a signal. The medium may be machine-readable, such as computer-readable. The medium may be an electronic, magnetic, optical, or other physical storage device that is capable of containing (i.e., storing) executable instructions. A memory resource may be said to store program instructions that when executed by a processor resource cause the processor resource to implement functionality of the system 200 of FIG. 7. A memory resource may be integrated in the same device as a processor resource or it may be separate but accessible to that device and the processor resource. A memory resource may be distributed across devices.

In the discussion herein, the components of system 200 have been described as circuitry or a combination of circuitry and executable instructions. Such components may be implemented in a number of fashions. Looking at FIG. 7, the executable instructions may be processor-executable instructions, such as program instructions, stored on the memory resource 220, which is a tangible, non-transitory computer-readable storage medium, and the circuitry may be electronic circuitry, such as processor resource 222, for executing those instructions. The instructions residing on a memory resource may comprise any set of instructions to be executed directly (such as machine code) or indirectly (such as a script) by a processor resource.

In some examples, the system 200 may include the executable instructions may be part of an installation package that when installed may be executed by a processor resource to perform operations of the system 200. In that example, a memory resource may be a portable medium such as a compact disc, a digital video disc, a flash drive, or memory maintained by a computer device, such as a web server, from which the installation package may be downloaded and installed. In another example, the executable instructions may be part of an application or applications already installed. A memory resource may be a non-volatile memory resource such as read only memory (ROM), a volatile memory resource such as random access memory (RAM), a storage device, or a combination thereof. Example forms of a memory resource include static RAM (SRAM), dynamic RAM (DRAM), electrically erasable programmable ROM (EEPROM), flash memory, or the like. A memory resource may include integrated memory such as a hard drive (HD), a solid state drive (SSD), or an optical drive.

All of the features disclosed in this specification (including any accompanying claims, abstract and drawings), and/or all of the elements of any method or process so disclosed, may be combined in any combination, except combinations where at least some of such features and/or elements are mutually exclusive.

The terms "include," "have," and variations thereof, as used herein, mean the same as the term "comprise" or appropriate variation thereof. Furthermore, the term "based on," as used herein, means "based at least in part on." Thus, a feature that is described as based on some stimulus may be based only on the stimulus or a combination of stimuli including the stimulus. Furthermore, the use of the words "first," "second," or related terms in the claims are not used to limit the claim elements to an order or location, but are merely used to distinguish separate claim elements.

The present description has been shown and described with reference to the foregoing examples. It is understood, however, that other forms, details, and examples may be made without departing from the spirit and scope of the following claims.

What is claimed is:

1. A scanner assembly comprising:
a housing that is substantially rectangular, the housing comprising:
 a first corner with a first extension cavity;
 a second corner with a second extension cavity that is substantially diagonally opposing to the first extension cavity; and
 a face defining a frame corresponding to an image sensor; and
an image sensor line oriented cornerwise from the first extension cavity to the second extension cavity.

2. The scanner assembly of claim 1, wherein:
the image sensor line is a plurality of image sensors oriented substantially in a linear alignment to form a scannable length of the scanner assembly; and
the image sensor line extends from within the first extension cavity to within the second extension cavity.

3. The scanner assembly of claim 1, wherein:
the housing is a z-shape and sealed; and
the frame is a border of a window through which the image sensor Is facing to take a sensor reading.

4. The scanner assembly of claim 1, further comprising:
a first leg having a first interlock face directed away from the first extension cavity, wherein the first extension cavity is defined within the first leg; and
a second leg having a second interlock face directed away from the second extension cavity, wherein the second extension cavity is defined within the second leg and the first interlock face and the second interlock face are complimentary.

5. The scanner assembly of claim 1, further comprising:
an illumination device within the housing, the illumination device aligned substantiality parallel to the image sensor line, wherein the image sensor line is an average intersection across an array of photoreceptors of a contact image sensor that extends along the width of the array of contact image sensors.

6. A scanner apparatus comprising:
a scanner assembly comprising:
   a sealed housing for electronics including an image sensor placed along an image sensor line; and
   a window on a face of the sealed housing through which the image sensor is facing to be oriented towards a scan location, the image sensor line is oriented substantially parallel to a plane on which the window is located and at an oblique angle with respect to a central axis of the body of the sealed housing along the plane of the window;
a media guide to guide media towards the window.

7. The scanner apparatus of claim 6, wherein:
the window includes glass; and
the image sensor line extends diagonally across the window.

8. The scanner apparatus of claim 7, wherein:
the face of the sealed housing on which the window is located is substantially rectangular with an indentation formed to align with a housing shape of another sealed housing, and
the sensor line extends across a media advance direction of the housing and past a wall of the formed indent into a leg cavity of the housing.

9. The scanner apparatus of claim 6, wherein:
the image sensor line is at an oblique angle with respect to a media advance direction.

10. The scanner apparatus of claim 9, further comprising:
a processor resource; and
a memory resource with instructions stored on that, when executed by the processor resource, cause the processor resource to:
   perform a shift processing operation to deskew rotation corresponding to the oblique angle of the image sensor line; and
   increase the resolution of a scanned image based on the oblique angle.

11. A scanner apparatus comprising:
a plurality of scanner assemblies located across a scanning zone of a media path, a first scanner assembly of the plurality of scanner assemblies comprising:
   a first overlap portion that overlaps a second scanner assembly of the plurality of scanner assemblies with respect to a first housing side of the first scanner assembly that is substantially parallel to a media advance direction and to a second housing side of the first scanner assembly that is substantially perpendicular to the media advance direction; and
   a first image sensor that extends into the first overlap portion along an image sensor line oriented at an oblique angle with respect to the media advance direction.

12. The scanner apparatus of claim 11, wherein:
the plurality of scanner assemblies are staggered across a width of media path in the media advance direction and staggered with respect to the media advance direction; and
the image sensor line of the first image sensor is oriented at an oblique angle with respect to the orientation of the housing across the media path.

13. The scanner apparatus of claim 12, wherein:
the first scanner assembly of the plurality of scanner assemblies has a second overlap portion that overlaps a third scanner assembly of the plurality of scanner assemblies, the first overlap portion located cornerwise to the second overlap portion;
the first scanner assembly and the second scanner assembly dovetail;
the first scanner assembly and the third scanner assembly dovetail; and
the image sensor line of the first scanner assembly extends from the first overlap portion of a housing of the first scanner assembly to the second overlap portion of the housing of the first scanner assembly.

14. The scanner apparatus of claim 11, wherein:
the first housing side of the first scanner assembly is overlapped by more than half of a width of the first housing side by the second scanner assembly with respect to the media advance direction.

15. The scanner apparatus of claim 11, wherein:
an offset distance between the first scanner assembly and the second scanner assembly at the first overlap portion is less than a distance between a first end of the image sensor line and a second end of an image sensor line with respect to a media advance direction oblique to the image sensor line.

* * * * *